United States Patent
Ray et al.

(10) Patent No.: US 11,002,331 B2
(45) Date of Patent: *May 11, 2021

(54) BRAKE PAD WITH PREFORMED MULTI-LAYER FRICTION PAD AND SHIM

(71) Applicant: NUCAP INDUSTRIES INC., Toronto (CA)

(72) Inventors: Arbesman Ray, Toronto (CA); Pham Nghi, Concord (CA)

(73) Assignee: Nucap Industries Inc., Scarborough (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,359

(22) Filed: Oct. 3, 2018

(65) Prior Publication Data

US 2019/0048955 A1 Feb. 14, 2019

Related U.S. Application Data

(62) Division of application No. 15/045,717, filed on Feb. 17, 2016, now Pat. No. 10,125,836.

(60) Provisional application No. 62/173,575, filed on Jun. 10, 2015, provisional application No. 62/182,776, filed on Jun. 22, 2015.

(51) Int. Cl.
*F16D 65/00* (2006.01)
*F16D 69/04* (2006.01)
*F16D 65/092* (2006.01)
*F16D 65/097* (2006.01)
*F16D 55/225* (2006.01)
*F16D 69/00* (2006.01)

(52) U.S. Cl.
CPC ....... *F16D 69/0408* (2013.01); *F16D 55/225* (2013.01); *F16D 65/092* (2013.01); *F16D 65/0971* (2013.01); *F16D 2069/005* (2013.01); *F16D 2069/0441* (2013.01); *F16D 2069/0466* (2013.01); *F16D 2069/0491* (2013.01); *F16D 2250/0084* (2013.01)

(58) Field of Classification Search
CPC .. F16D 65/0006; F16D 65/092; F16D 65/095; F16D 69/0408; F16D 2069/00441; F16D 2069/0483; B32B 3/30; B32B 7/08; B32B 9/007
USPC ......... 188/250 B, 250 G, 251 A, 251 R, 73.1
See application file for complete search history.

(56) References Cited

U.S. PATENT DOCUMENTS

| | | |
|---|---|---|
| 4,373,615 A | 2/1983 | Melinat |
| 4,799,579 A | 1/1989 | Myers et al. |
| 4,846,312 A | 7/1989 | Sweetmore et al. |

(Continued)

FOREIGN PATENT DOCUMENTS

| | | |
|---|---|---|
| DE | 19706122 | 8/1998 |
| DE | 202004014161 | 12/2004 |

(Continued)

OTHER PUBLICATIONS

Office Action issued from European Patent Office dated Dec. 18, 2020 corresponding to EP 16157202.9.

*Primary Examiner* — Christopher P Schwartz
(74) *Attorney, Agent, or Firm* — Aird & McBurney LP (57) ABSTRACT

A method of assembling a brake pad includes impaling a first layer of a preformed multi-layer friction pad on piercing members of a rotor facing surface of a brake pad backing plate. A shim is concurrently assembled to a caliper facing surface of the backing plate.

9 Claims, 7 Drawing Sheets

(56) References Cited

U.S. PATENT DOCUMENTS

| | | | |
|---|---|---|---|
| 5,161,654 A * | 11/1992 | Valentin | B22F 1/0003 188/251 R |
| 5,285,873 A | 2/1994 | Arbesman | |
| 5,376,410 A * | 12/1994 | MacKelvie | B21J 5/12 427/290 |
| 5,396,972 A * | 3/1995 | Grele | F16D 65/0006 188/250 B |
| 5,407,034 A * | 4/1995 | Vydra | B32B 15/08 188/73.37 |
| 5,480,008 A | 1/1996 | Hummel et al. | |
| 5,515,950 A | 5/1996 | Kwolek | |
| 5,535,860 A | 7/1996 | Hummel et al. | |
| 5,699,882 A | 12/1997 | Ikegami et al. | |
| 5,732,800 A * | 3/1998 | Spigener | B29C 43/006 188/234 |
| 6,122,951 A | 9/2000 | Arbesman | |
| 6,142,263 A | 11/2000 | Lotfipour | |
| 6,405,840 B1 | 6/2002 | Foster et al. | |
| 6,464,047 B1 * | 10/2002 | Arbesman | B21J 5/12 188/250 G |
| 6,672,433 B2 * | 1/2004 | Yamaguchi | F16D 65/0006 188/250 B |
| 6,866,126 B2 | 3/2005 | Bosco et al. | |
| 6,899,783 B2 | 5/2005 | Oguri et al. | |
| 6,913,120 B2 | 7/2005 | Bosco et al. | |
| 7,097,009 B2 * | 8/2006 | Shao | F16D 69/02 188/250 B |
| 7,222,701 B2 | 5/2007 | Pham | |
| 7,370,738 B2 | 5/2008 | Vollweiter | |
| 7,568,561 B2 | 8/2009 | Bosco, Jr. | |
| 7,686,142 B2 | 3/2010 | Jung | |
| 8,225,911 B2 | 7/2012 | Lin et al. | |
| 8,474,581 B2 | 7/2013 | Bosco, Jr. | |
| 8,505,698 B2 | 8/2013 | Liu et al. | |
| 8,657,081 B2 | 2/2014 | Chung | |
| 8,683,840 B2 | 4/2014 | Tuma et al. | |
| 8,869,955 B2 | 10/2014 | Parild et al. | |
| 9,086,106 B2 | 7/2015 | Lelievre et al. | |
| 9,689,450 B2 * | 6/2017 | Arbesman | F16D 69/04 |
| 10,125,836 B2 * | 11/2018 | Arbesman | F16D 55/225 |
| 2004/0016608 A1 * | 1/2004 | Gutowski | F16D 65/092 188/73.1 |
| 2006/0027427 A1 | 2/2006 | Anda et al. | |
| 2006/0278482 A1 | 12/2006 | Kahan et al. | |
| 2007/0227841 A1 | 10/2007 | Hara et al. | |
| 2008/0003401 A1 * | 1/2008 | Barnes | B29C 65/562 428/99 |
| 2008/0011562 A1 * | 1/2008 | Hilbrandt | F16D 65/092 188/250 B |
| 2010/0170758 A1 * | 7/2010 | Chen | F16D 65/092 188/250 G |
| 2012/0152667 A1 | 6/2012 | Bosco, Jr. | |
| 2013/0152654 A1 | 6/2013 | Arbesman et al. | |
| 2013/0175127 A1 | 7/2013 | MacKelvie | |
| 2013/0240304 A1 | 9/2013 | McCaffrey | |
| 2013/0277160 A1 | 10/2013 | Dreher et al. | |
| 2015/0053517 A1 | 2/2015 | Arbesman et al. | |
| 2015/0086750 A1 | 3/2015 | Arbesman et al. | |
| 2015/0099093 A1 | 4/2015 | Arbesman et al. | |
| 2016/0160944 A1 * | 6/2016 | Arbesman | F16D 65/092 188/251 A |
| 2017/0234385 A1 * | 8/2017 | Arbesman | F16D 65/092 188/251 A |

FOREIGN PATENT DOCUMENTS

| | | |
|---|---|---|
| DE | 102005028796 | 7/2010 |
| EP | 1519071 A1 | 3/2005 |
| FR | 2570150 A1 | 8/1998 |
| JP | 08270692 | 10/1996 |
| WO | 2008/097025 A1 | 8/2008 |
| WO | 2014/006175 A1 | 1/2014 |
| WO | 2015/010183 A1 | 1/2015 |

* cited by examiner

BRAKE PAD WITH PREFORMED MULTI-LAYER FRICTION PAD AND SHIM

CROSS-REFERENCE TO RELATED APPLICATIONS

This application is a divisional of U.S. Non-Provisional application Ser. No. 15/045,717, entitled "BRAKE PAD WITH PREFORMED MULTI-LAYER FRICTION PAD", filed Feb. 17, 2016, and claims the benefit of U.S. Provisional Application No. 62/173,575, entitled "BRAKE PAD WITH PREFORMED MULTI LAYER FRICTION PAD", filed Jun. 10, 2015, and U.S. Provisional Application No. 62/182,776, entitled "BRAKE PAD WITH PREFORMED MULTI-LAYER FRICTION PAD & SHIM", filed Jun. 22, 2015. The entire contents of U.S. Provisional Application No. 62/173,575 and U.S. Provisional Application No. 62/182,776 are hereby incorporated herein by reference.

FIELD OF THE INVENTION

The disclosure relates to brake pads. More specifically, the disclosure relates to brake pads having pre-formed friction pads, and methods for manufacturing brake pads with pre-formed friction pads. The disclosure additionally relates to brake pads having brake shims, and methods for securing a brake shim to a brake pad backing plate.

BACKGROUND

A braking system may slow a moving vehicle by converting its kinetic energy into heat energy. The heat is the result of friction between a rotating disc (rotor) and a pair of brake pads squeezing the rotor.

A brake pad may have a pad of friction material (also referred to as a friction pad, friction element, or friction puck) attached to a brake pad backing plate (e.g. a steel backing plate). Two such brake pads may be installed on opposite sides of a fixed hydraulic caliper that straddles the rotor.

SUMMARY

The following summary is intended to introduce the reader to various aspects of the applicant's teaching, but not to define any invention.

Some friction pads are made from a resin adhesive, which may be a phenolic resin adhesive powder, mixed with fibres of copper, brass, bronze, glass, steel, and aramide, and further mixed with minerals such as phlogopite, muscovite, talc, vermiculite, agalmatolite, kaolin, sericite chlorite, cashew dust, and graphite. The constituents and their proportions can determine the properties of the friction pad such as its hardness. The mixture is poured into a mould containing a single brake pad backing plate (also referred to herein as a backing plate or a plate). With compression and heat, the mixture is shaped, cured, and mould-bonded to the backing plate to form the pad of friction material.

Steel backing plates may be stamped from a steel strip of the required thickness as determined by vehicle weight and/or performance. The lowest cost plates are often bare steel, which may provide a good surface for the resin adhesive to adhere to. However, bare steel, even when painted, can rust over the long term, which can lead to friction pad delamination. Some plates use a texturized surface of raised and/or sunken features formed by specialized tooling. The plate, with the texturized surface, may then be coated/plated to resist rusting. These plates with textured surfaces provide a plurality of structures for the friction material to flow about and lock onto as the friction material is compressed and cured. Such texturing can mechanically reinforce the bond between the friction pad and the backing plate, and may improve shear strength and resistance against delamination of the friction pad.

This mould-bonding process may be done in batches, where a certain number of metal moulds are filled with brake plates and uncured friction material, and layered in a heat press for a time and then removed, emptied, and cleaned for the next batch. Such heat treatment can heat the steel backing plates by about 260° F. (127° C.), after which the backing plates are cooled. In some examples, the backing plates may be heated from room temperature to about 330° F. (165° C.).

In the present application, a brake pad is disclosed which, in some examples, may allow for the backing plate and the friction pad to be separately made and then assembled at room temperature, optionally with no heating of the backing plate during assembly, in an efficient, continuous process that may save time, money, and energy. This energy saving can reduce greenhouse gas emissions and lower the carbon footprint of the brake industry. Furthermore, in some examples, a brake shim (also referred to herein as a shim) may be secured to (i.e. assembled to) the backing plate. This may be done concurrently with securing the friction pad to the backing plate, which may allow for the brake pad, including the friction pad, backing plate, and shim, to be assembled in a single step in a single press.

In some examples, the backing plate is texturized with an array of raised piercing members (such as barbs or tangs) and may then be plated or coated against rust. The piercing members may be formed so that each piercing member has a pointed tip that points away from the surface of the workpiece (as opposed to the pointed tip being curled over and pointed towards the workpiece), so that the pointed tip may pierce and impale a pre-formed friction pad.

The friction pad may be formed, shaped, and cured separate from the plate. At least two different materials may be used to form at least two respective layers in the friction pad, which may be referred to as a multi-layer friction pad (or in some examples a dual layer friction pad). The first layer, which may be adjacent the plate in the assembled brake pad, may be generally thin and compounded to be relatively soft, so that it can be pierced by the piercing members of the backing plate without crumbling or fracturing. The second layer, which may be adjacent the first layer, may be standard friction material. The first and second layers, which may each be formed from a powder, and may each include resins such as phenolic resins, may intermingle and bond together when compressed, so that the first and second layers are integral when cured, and may be indistinguishable from each other by visual inspection.

In some examples, the friction material can be continuously formed into a large plate from which the individual friction pads can be cut by sawing, water jetting, shearing and the like.

To assemble the brake pad, the preformed multi-layer friction pad may be pressed onto the texturized surface of the backing plate, so that the piercing members pierce the first layer of the friction pad, to secure the friction pad to the backing plate. In some examples, a shim may be secured to the backing plate concurrently with pressing the preformed multi-layer friction pad onto the texturized surface of the backing plate. For example, the friction pad, backing plate, and shim may all be pressed together at the same time and using the same press. During pressing, various features of the shim may bend towards the backing plate to engage with the backing plate, for example to mechanically lock to the backing plate.

According to some aspects, a brake pad comprises a brake pad backing plate having a rotor facing surface with a plurality of piercing members thereon. A friction pad is secured to the rotor facing surface. The friction pad comprises a first layer of a first material impaled on the piercing members, and a second layer of a friction material adjacent the first layer. The friction material has a different composition from the first material and is harder than the first material. The piercing members pierce only the first layer.

The piercing members may have a distal curved portion that abuts the second layer. The piercing members may be hook shaped. The piercing members may comprise material raised from the backing plate.

The first and second layers may be integral.

The backing plate may further comprise a caliper facing surface opposed to the rotor facing surface, and the brake pad may further comprise a shim secured to the caliper facing surface.

The shim may include at least one bent feature engaging the backing plate. The caliper facing surface may comprise at least a first backing plate hole, and the bent feature may comprise a bent annular tab bent to engage a circumferential edge of the backing plate hole.

The brake plate may comprise a pair of opposed side edges extending between the rotor facing surface and the caliper facing surface, and the bent feature may comprise a first bent side tab engaging one of the side edges.

According to some aspects, a method of assembling a brake pad comprises a) impaling a first layer of a preformed multi-layer friction pad on piercing members of a rotor facing surface of a brake pad backing plate.

The multi-layer friction pad may further comprise a second layer of a friction material adjacent the first layer, and the friction material may have a different composition from the first material and be harder than the first material.

In some examples, the backing plate is not heated during the impaling step.

The method may further comprise: b) concurrently with step a), securing a shim to a caliper facing surface of the backing plate. Step b) may comprise bending at least a first feature of the shim to engage with the backing plate.

Step b) may comprise forming a bent annular tab in the shim. The bent annular tab may be bent to engage a circumferential edge of a backing plate hole of the backing plate.

Step b) may comprise bending a side tab of the shim towards the rotor facing surface to form a bent side tab engaging a side edge of the backing plate.

In step b), the first feature of the shim may be bent into a backing plate hole of the backing plate to engage a circumferential edge of the backing plate hole. The backing plate hole may have a backing plate hole diameter, and the shim may include at least a first shim hole having a shim hole diameter that is less than the backing plate hole diameter. In step a), the shim hole may be aligned with the backing plate hole so that a circumferential portion of the shim surrounding the shim hole overhangs the backing plate hole. In step b), the circumferential portion of the shim surrounding the shim hole may be bent into the backing plate hole to form a bent annular tab.

Prior to step b), a pressure sensitive adhesive may be applied between the shim and the caliper facing surface.

According to some aspects, a method of securing a shim to a brake pad backing plate comprises: a) positioning a plate facing surface of the shim against a caliper facing surface of the backing plate; and b) after step a), bending at least a first feature of the shim to engage with the backing plate.

Step b) may comprise bending the first feature of the shim into a backing plate hole of the backing plate to engage a circumferential edge of the backing plate hole. The backing plate hole may have a backing plate hole diameter, and the shim may include at least a first shim hole having a shim hole diameter that is less than the backing plate hole diameter. In step a) the shim hole may be aligned with the backing plate hole so that a circumferential portion of the shim surrounding the shim hole overhangs the backing plate hole. The circumferential portion of the shim surrounding the shim hole may be bent into the backing plate hole to form a bent annular tab.

Prior to step a), the method may further comprise applying a pressure sensitive adhesive to at least one of the plate facing surface and the caliper facing surface.

Step b) may comprise bending a side tab of the shim towards a rotor facing surface of the backing plate to form a bent side tab engaging a side surface of the backing plate.

According to some aspects, a method of assembling a brake pad comprises: a) securing a friction pad to a rotor facing surface of a brake pad backing plate; and b) concurrently with step a), securing a shim to a caliper facing surface of the backing plate.

Step a) may comprise pressing the friction pad against the rotor facing surface using a press, and step b) may comprise pressing the shim against the caliper facing surface using the press. Step a) and step b) may be performed in a single pressing step.

Step b) may comprise bending at least a first feature of the shim to engage the backing plate. Step b) may comprise forming a bent annular tab in the shim, the bent annular tab may be bent to engage a circumferential edge of a backing plate hole of the backing plate. Step b) may comprise bending a side tab of the shim towards the rotor facing surface to form a bent side tab, the bent side tab may engage a side edge of the backing plate.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Figure 1:
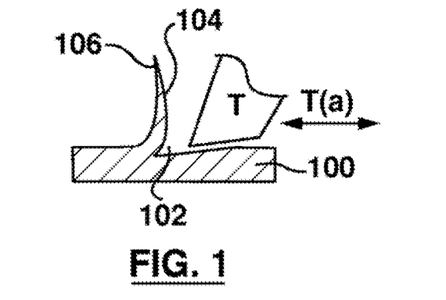
FIG. 1 is a cross-sectional view taken through a portion of a workpiece, showing a tool traversing a surface of the workpiece to form a pointed barb.
Figure 3:
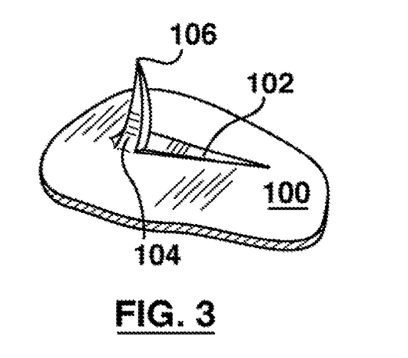
FIG. 3 is a perspective view of the portion of the workpiece of FIG. 1.
Figure 4:
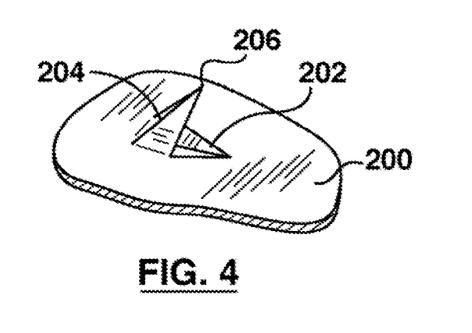
FIG. 4 is a perspective view of the portion of the workpiece of FIG. 2.
Figures 10, 11:
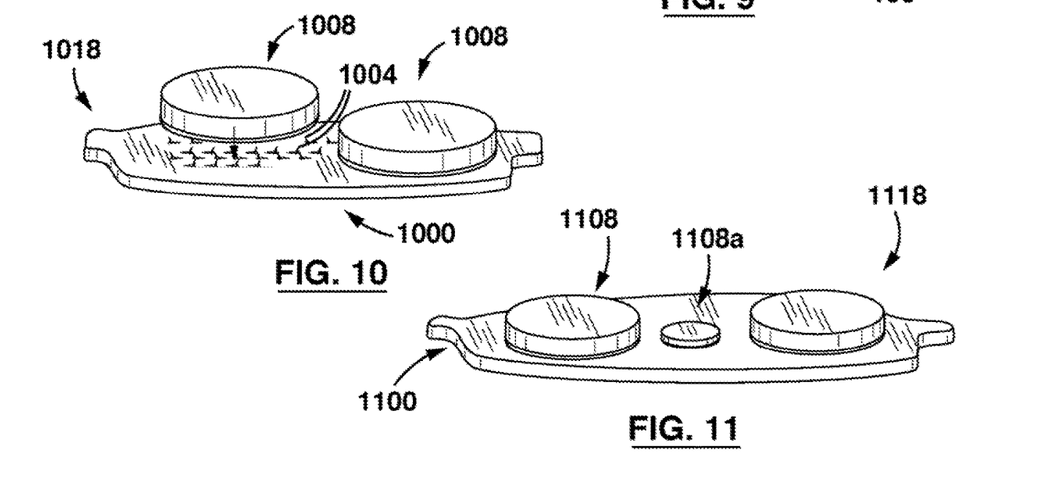
FIG. 10 is a perspective exploded view of an example brake pad.
FIG. 11 is a perspective view of an alternative example a brake pad.

Referring to FIG. 1, in the example illustrated, a surface of a workpiece 100 is cut into by a tool T with a reciprocating motion T(a). The surface of the workpiece 100 may generally represent a rotor facing surface of a brake pad backing plate (e.g. a backing plate as shown in FIGS. 10 and 11). The material carved from the resulting groove 102 forms a barb 104 with a pointed tip 106 (see also FIG. 3). The barb-textured workpiece 100 may be protectively coated by, for example, plating with zinc, e-coating, or using another suitable process.

Figure 5:
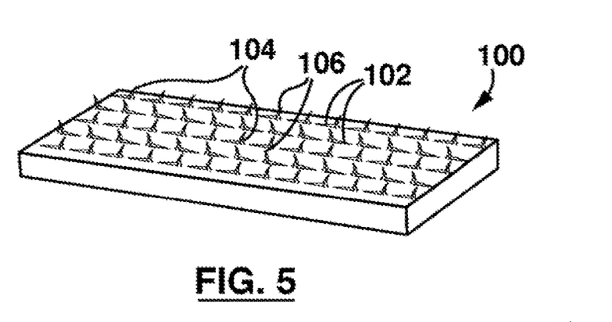
FIG. 5 is a perspective view of the workpiece of FIG. 1.

The barbs 104 can be formed in a wide range of heights, for example, from about 0.010 of an inch to about 0.125 of an inch as measured from the rotor facing surface. In some examples, barbs 104 having a height of about 0.090 of an inch may sufficiently penetrate a multi-layer friction pad (for example the multi-layer friction pad 108 shown in FIG. 7). The illustrated tool T is a schematic depiction of a complex tool that may be used for this texturing process. The tool T may include numerous cutting tips for carving a plurality of grooves 102 simultaneously from which a like number of barbs 104 may be raised. The tool T may optionally include cutting tips that cut in different directions, such as opposite directions, to form barbs that are pointed in different directions. FIG. 5 shows a perspective view of a workpiece 100 textured with barbs 104. In the example illustrated, the barbs 104 are formed in rows using cutting tips that cut in opposite directions.

Figure 2:
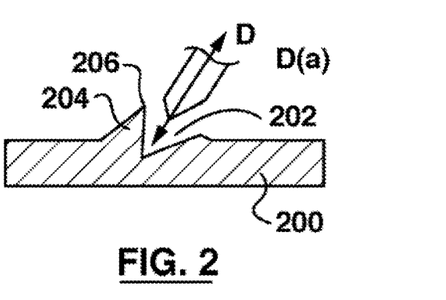
FIG. 2 is a cross-sectional view of a portion of another workpiece, showing a tool stabbing an indent into the workpiece to form a pointed tang.
Figure 6:
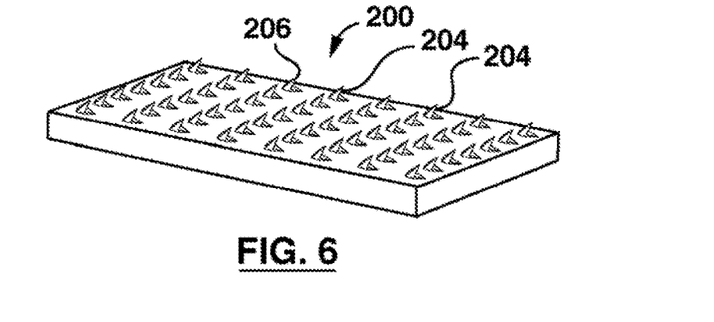
FIG. 6 is a perspective view of the workpiece of FIG. 2.

Referring now to FIG. 2, a surface of an alternative workpiece 200 is shown being impacted with a chisel tool D having a reciprocating motion D(a). The surface of the workpiece 200 may generally represent a rotor facing surface of a brake pad backing plate (e.g. a backing plate as shown in FIGS. 10 and 11). The chisel tip of the chisel tool D may form an indent 202 in the workpiece 200. Material displaced during formation of the indent 202 can form a raised tang 204 having a pointed tip 206. Tangs 204 may in some examples be thicker than barbs 104 having a height equivalent to that of the tangs 204. The tang-textured workpiece 200 may in some examples be protectively coated, for example, by plating with zinc, e-coating, or by another suitable process. FIG. 6 shows a perspective view of the workpiece 200 textured with tangs 204.

As used herein, the term "piercing members" may be used to refer to barbs such as barbs 104, tangs such as tangs 204, and/or other suitable piercing members.

In the examples illustrated, the piercing members 104, 204 of FIGS. 1 to 4 are initially formed so that the pointed tips 106, 206 point away from the surface of the workpieces 100, 200, so that the piercing members 104, 204 may pierce and impale a preformed friction pad. That is, in the examples illustrated, the tips 106, 206 are initially formed so that the tips 106, 206 are not curled over to point back down towards the surface of the workpiece 100, 200. For example, the tips 106, 206 may initially be oriented at an angle of between about 45 degrees and about 135 degrees with respect to the surface of the workpieces 100, 200. In some examples, the tips 106, 206 may be oriented at an angle of between about 60 degrees and about 110 degrees with respect to the surface of the workpieces 100, 200. In some examples, the tips 106, 206 may be oriented at an angle of between about 80 degrees and about 100 degrees with respect to the surface of the workpieces 100, 200.

Figures 7, 8, 9:
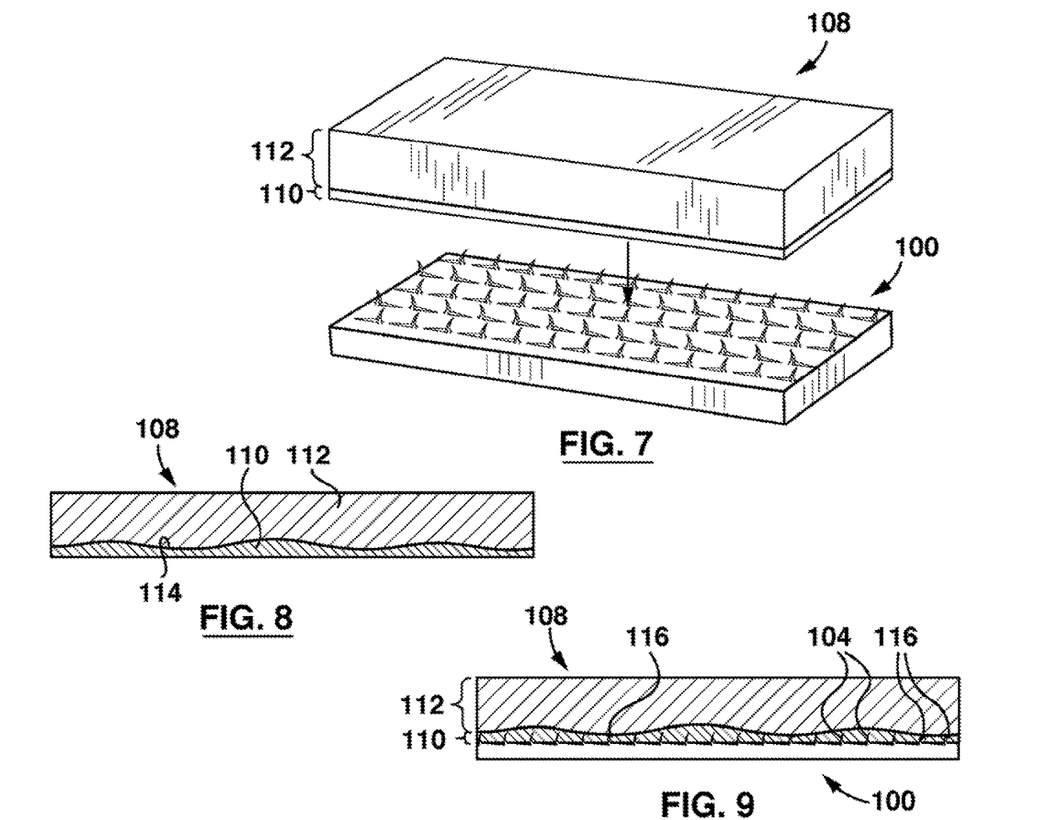
FIG. 7 is a perspective view of a multi-layer friction pad positioned above the workpiece of FIG. 1.
FIG. 8 is a cross-sectional view taken through the multi-layer friction pad of FIG. 7.
FIG. 9 is a cross-sectional view showing the multi-layer friction pad of FIG. 7 impaled on the workpiece of FIG. 1.
Figure 12:
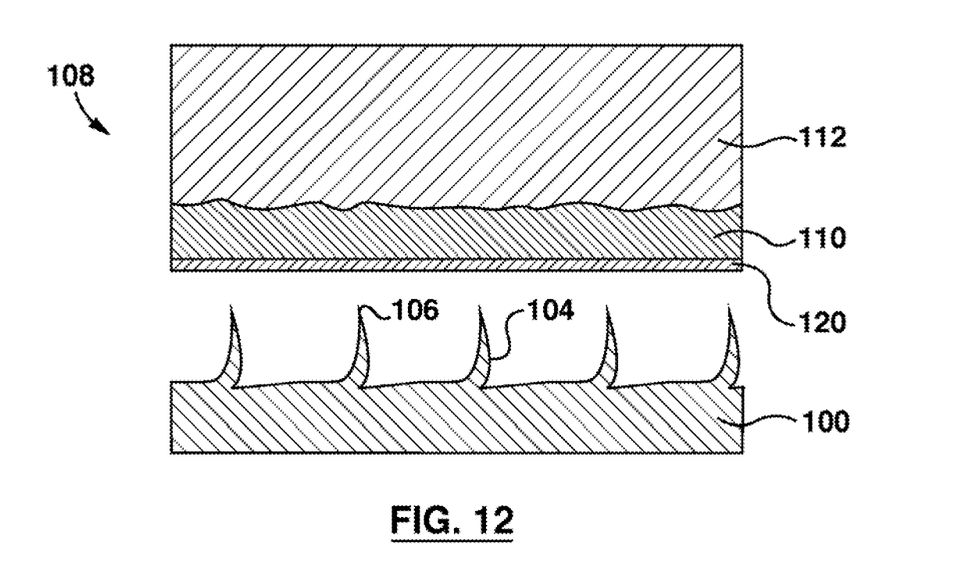
FIG. 12 is a cross-sectional view taken through a portion of an assembly similar to that of FIG. 7, but also including an adhesive layer.

Referring to FIGS. 7 and 12, a preformed multi-layer friction pad 108 is shown. Below the friction pad 108 is the barbed workpiece 100. In the example shown, the multi-layer friction pad 108 has a first layer 110 of a first material and a second layer 112 of a friction material. The friction material has a different composition from the first material, and is harder than the first material. The second layer 112 is an upper, harder layer (wherein "upper" indicates that the second layer 112 is spaced away from a brake plate when the friction pad 108 is secured to the brake plate), and the first layer 110 is a lower, softer under layer (wherein "lower" indicates that the first layer 110 is adjacent the brake plate when the friction pad 108 is secured to the brake plate). In the example illustrated, the first and second layers 110, 112 are generally planar, and the second layer 112 is thicker than the relatively thinner first layer 110. When the friction pad 108 is secured to a brake plate, the second layer 112 is adjacent the first layer 110, with the first layer 110 intermediate the rotor facing surface of the brake plate and the second layer 112.

Referring to FIGS. 8 and 9, in some examples, the material used to form the first layer (referred to herein as the first material), for example a material including resin powder, may be embossed (e.g. at 114) to create an undulating layer. This may help to prevent the formation of a weakened shear plane between the first layer 110 and the second layer 112. Embossing patterns such as circular, crisscross, wave, and/or other patterns may be made by pressing an embossing plate onto the material of the first layer 110 after it has been poured in place.

Figure 13:
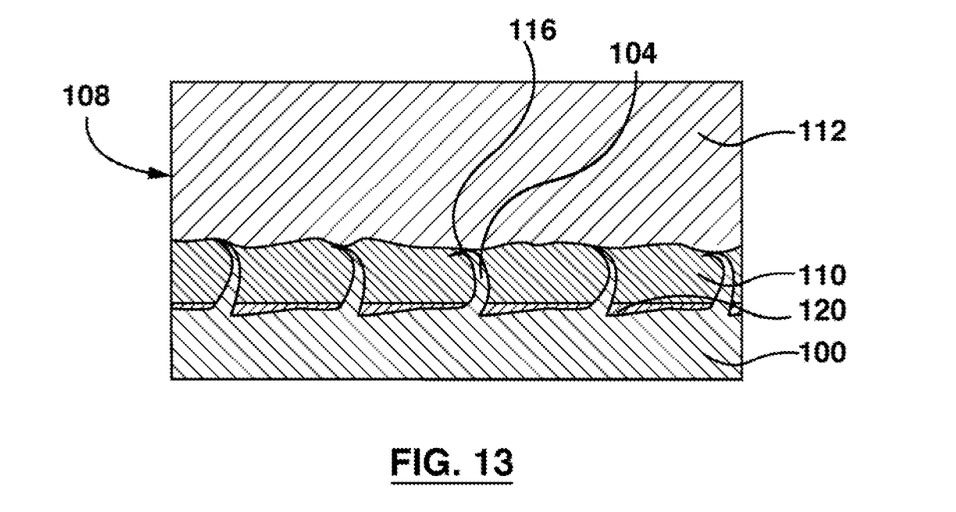
FIG. 13 is a cross-sectional view taken through a portion of an assembly similar to that of FIG. 9, but also showing an adhesive layer.

Referring to FIGS. 9 and 13, the friction pad 108 and the workpiece 100 may be brought together by a press or roll, or by impact, such that the piercing members 104 pierce and penetrate the first layer 110, and so that the first layer 110 is impaled on the piercing members 104. The piercing members 104 may fully or partially penetrate the first layer 110. As the piercing members 104 enter the first layer 110, frictional and compressive forces may develop therebetween to lock or clamp the friction pad 108 and the workpiece 100 together. The relative softness of the first layer 110 may facilitate penetration of the first layer 110 with the piercing members 104, without crumbling or cracking of the friction pad 108.

Referring still to FIGS. 9 and 13, some or all piercing members 104 may fully penetrate the first layer 110, and then be forced against the relatively harder second layer 112. In the example shown, the hardness of the second layer 112 inhibits the piercing members 104 from piercing the second layer 112. In the example illustrated, the piercing members 104 pierce only the first layer 110. Contact with the relatively harder second layer 112 may deform some or all of the tips 106 into heads 116 and cause the piercing members 104 to take on a hook shape. These hook shaped piercing members 104 have an upper (distal) curved portion which abuts the second layer 112. This deforming of the piercing members 104 may provide a rivet effect for added attachment strength of the friction pad 108 to the workpiece 100.

In some examples, the workpiece 100 is not heated during the impaling step. In other words, the workpiece 100 and the friction pad 108 may be secured together without concurrently heat treating the friction pad 108 and/or the workpiece 100. The workpiece 100 may be, for example, at about room temperature, or at a temperature less than 330.degree. F. (165.degree. C.), during the impaling step.

Referring now to FIG. 10, a partially assembled brake pad 1018 is shown. In the example illustrated, the brake pad 1018 includes a brake pad backing plate 1000 with two texturized regions for receiving two multi-layer disc-shaped friction pads 1008. The backing plate 1000 is textured with piercing members in the form of barbs 1004. Each of the two texturized regions are textured in a generally circular pattern to match the shape of the disc-shaped friction pads 1008. Disc-shaped friction pads may allow for better cooling and easier cutting from a large sheet of cured friction material. In other examples, the friction pad(s) may be of another shape, such as a shape that matches the backing plate 1000.

Referring to FIG. 11, an assembled brake pad 1118 is shown. In the example illustrated, the brake pad 1118 includes two disc-shaped friction pads 1108, which are similar to the friction pads 1008 of FIG. 10, and also includes an auxiliary multi-layer friction pad 1108a. The friction pads 1108 and 1108a are impaled on piercing members of the backing plate 1100. The auxiliary multi-layer friction pad 1108a has a thickness slightly greater than a pre-determined minimum safe thickness corresponding to an allowed wear limit of the friction pads 1108. The auxiliary multi-layer friction pad 1108a may be compounded with a suitable detectable material, for example, a material that can provide a detectable warning signal, such as a distinct odor or color, when ablated. When the friction pads 1108 ablate to near the minimum safe thickness, the auxiliary multi-layer friction pad 1108a may ablate and provide the warning signal to inform a vehicle operator that the brake pads may need service.

In some examples, the multi-layer friction pads described herein may be secured to a texturized backing plate without requiring additional adhesive beyond what is included in the multi-layer friction pad. In other examples, adhesives 120 (shown in FIGS. 12 and 13), such as chemical bonding agents, may be used to provide increased bonding strength, and to seal against moisture infiltration. Providing an adhesive layer between the friction pad 108 and the textured backing plate (i.e. workpiece 100) may reduce brake generated noise transmission. Certain adhesive resins (for example, pressure sensitive adhesives) may cure during assembly of the friction pad 108 and the backing plate. For example, during impact or pressure assembly, the piercing members may generate friction and increase the temperature of the surrounding adhesive. The temperature increase may be sufficient for the adhesive resins to molecularly cross-link and create a strong, high-temperature-resistant adhesive bond.

Referring now to FIGS. 14 to 25, an alternative brake pad 1418 is shown. Referring to FIGS. 14 to 17, the brake pad 1418 includes a brake pad backing plate 1400 that is similar to the backing plate 1000. The backing plate 1400 includes a rotor facing surface 1430 with piercing members 1404 (shown in FIGS. 20 and 22) formed thereon. A pre-formed multi-layer friction pad 1408 is secured to the rotor facing surface 1430 by the piercing members 1404 in a manner similar to that described above with respect to FIGS. 1 to 13.

Referring still to FIGS. 14 to 17, in the example illustrated, the backing plate 1400 includes a caliper facing surface 1432 opposed to the rotor facing surface 1430. A shim 1434 is secured against the caliper facing surface 1432. The shim 1434 is a noise reducing shim that in use is located between the backing plate 1400 and the caliper (not shown) of the brake system.

Figure 14:
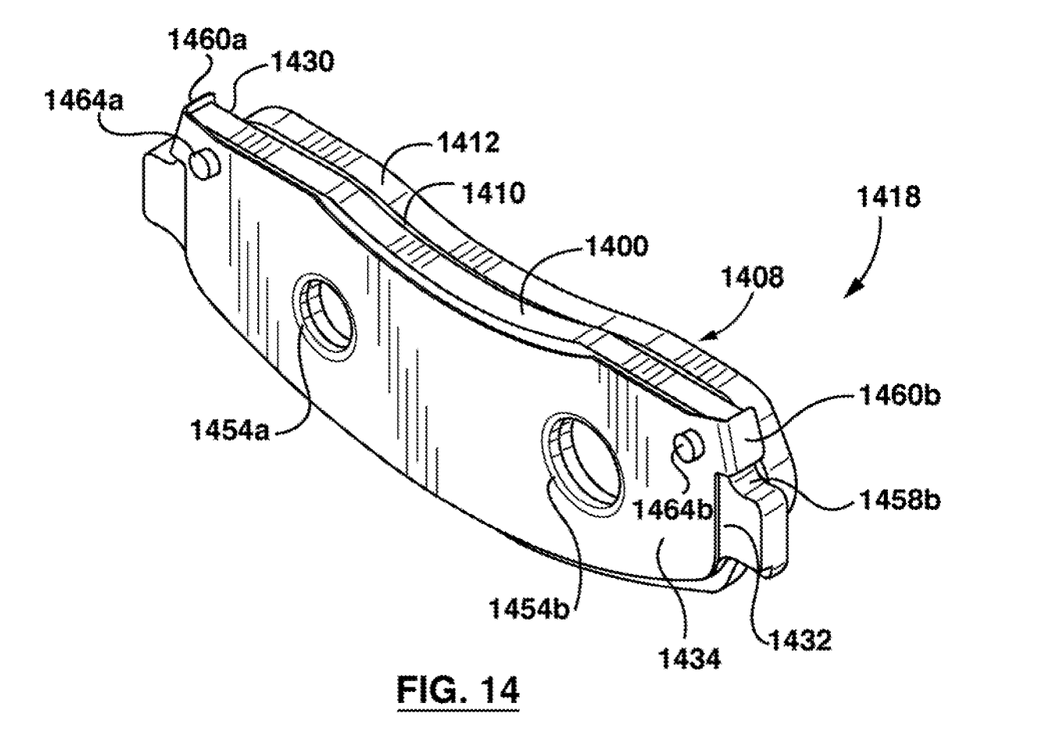
FIG. 14 is a perspective view of an alternative brake pad, including a friction pad, backing plate, and shim.
Figure 15:
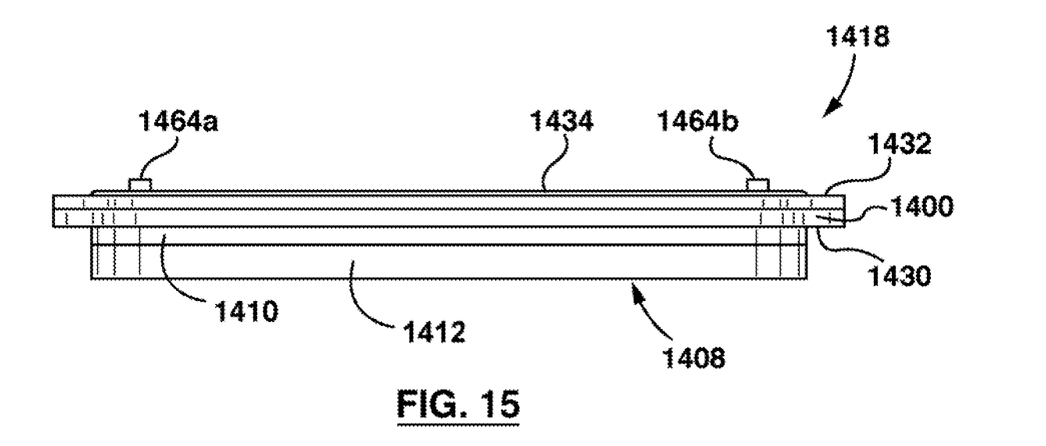
FIG. 15 is a side view of the brake pad of FIG. 14.
Figure 16:
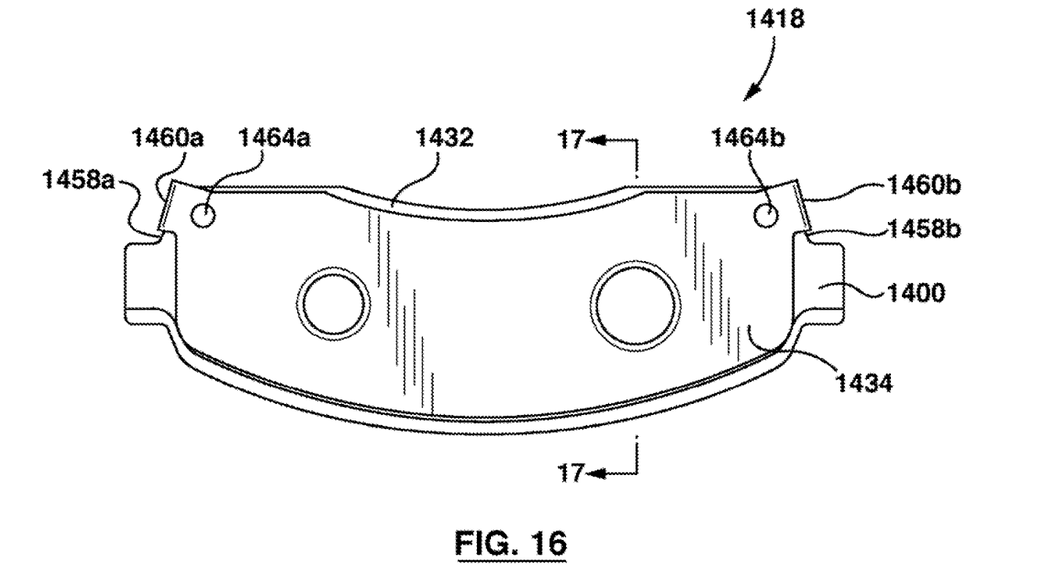
FIG. 16 is a top view of the brake pad of FIG. 14.
Figure 17:
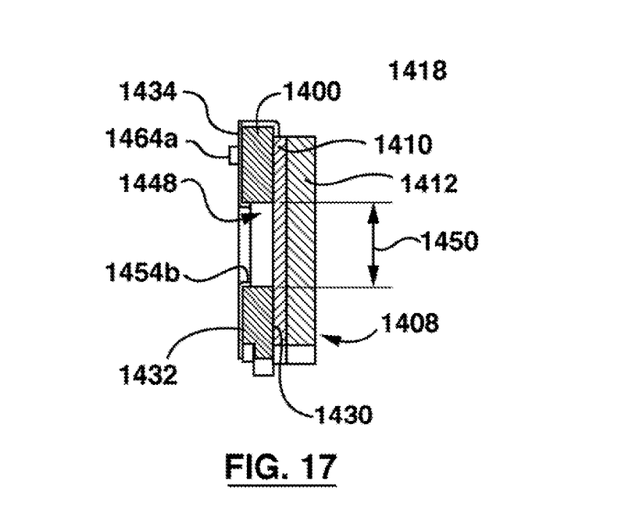
FIG. 17 is a cross-sectional view taken along line 17-17 in FIG. 16.

As will be described in further detail below, the shim 1434 and the friction pad 1408 may be concurrently secured to the backing plate 1400. The friction pad 1408 and the shim 1434 can be secured to the backing plate 1400 using the same press. This may allow for the brake pad 1418, including the backing plate 1400, the friction pad 1408, and the shim 1434, to be assembled in a single step and in a single press. This may allow for streamlined manufacturing, repeatability, and mass production. For example, in a single pressing step in a single press, the friction pad 1408 may be impaled on the piercing members 1404 of the backing plate 1400, and features of the shim 1434 may be bent to engage the backing plate 1400 and help to secure the shim 1434 thereto by mechanically locking to the backing plate 1400.

Figure 18:
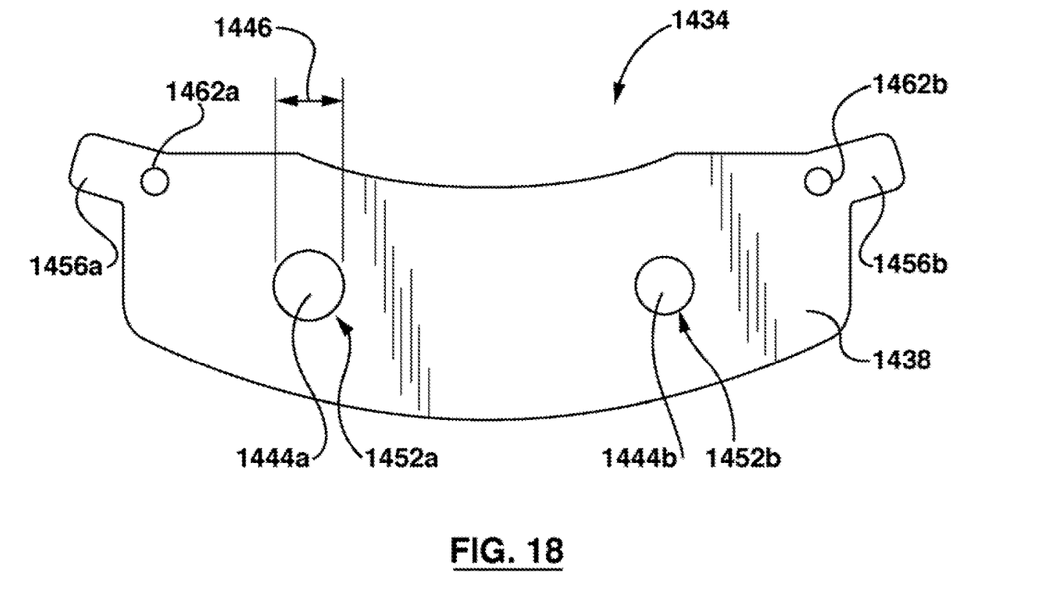
FIG. 18 is a top view of the shim of FIG. 14, prior to assembly to the backing plate.
Figure 19:
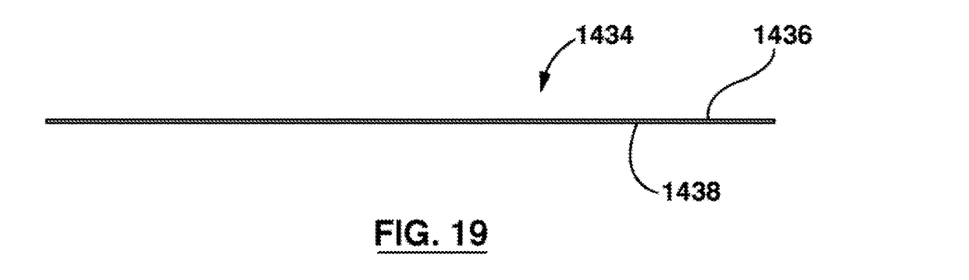
FIG. 19 is a side view of the shim of FIG. 18.
Figures 20, 21:
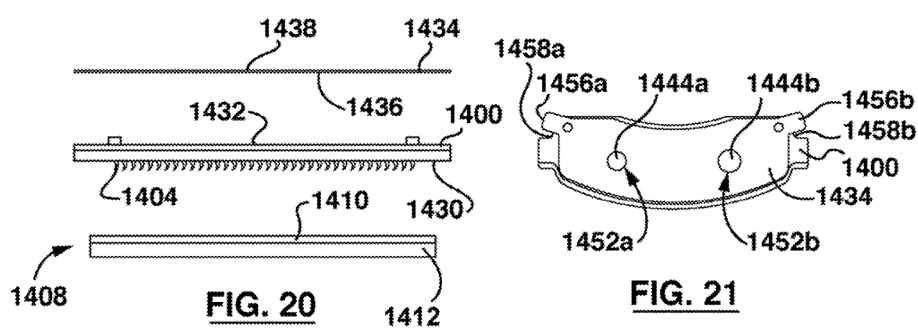
FIG. 20 is a schematic side view of the friction pad, backing plate, and shim of FIG. 14, prior to assembly.
FIG. 21 is a top view of the friction pad, backing plate, and shim of FIG. 20.
Figure 22:
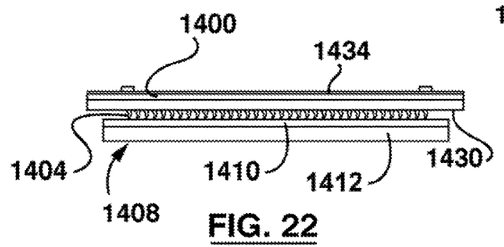
FIG. 22 is a schematic side view of the friction pad, backing plate, and shim of FIG. 14, in an aligned configuration, and ready to be secured together by a press.
Figure 23:
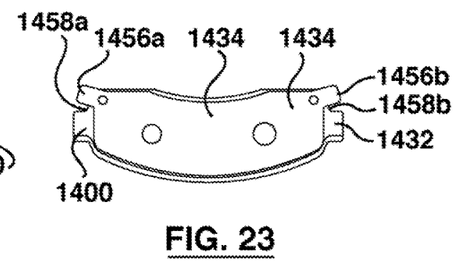
FIG. 23 is a top view of the friction pad, backing plate, and shim of FIG. 22.

Referring to FIGS. 18 and 19, the shim 1434 is shown prior to being secured to the backing plate 1400. The shim 1434 may be made from a metal such as steel, and has a shape generally corresponding to the shape of the backing plate 1400. Various other shims of various other shapes, styles, and materials may also be made and used in accordance with the present disclosure.

[Referring still to FIGS. 18 and 19, in the example illustrated, the shim 1434 is generally planar prior to assembly to the backing plate 1400, and includes a plate facing surface 1436 that in use faces the backing plate 1400, and an opposed caliper facing surface 1438.

The shim 1434 may include at least one feature that may be bent during assembly to form a bent feature that engages the backing plate 1400. The bent feature may help to secure the shim 1434 to the backing plate 1400, by mechanically locking to the backing plate 1400. For example, as will be described in further detail below, the shim 1434 may include at least a first shim hole. The portion of the shim 1434 surrounding the first shim hole may be bent during assembly to help secure the shim 1434 to the backing plate 1400. As an alternative or in addition, the shim 1434 may include at least a first tab which may be bent during assembly to help secure the shim 1434 to the backing plate 1400.

Referring still to FIGS. 18 and 19, in the example shown, the shim 1434 includes a pair of shim holes 1444a, 1444b (also referred to as a first shim hole 1444a and a second shim hole 1444b), each having a respective shim hole diameter 1446. As will be described in further detail below, during assembly, the shim holes 1444a, 1444b may be aligned with respective holes 1448 of the backing plate 1400 (also referred to as backing plate holes 1448), shown in FIG. 17. The shim hole diameter 1446 (FIG. 18) may be less than the diameter 1450 (FIG. 17) of the backing plate holes (also referred to as a backing plate hole diameter 1450), so that circumferential portions 1452a, 1452b of the shim surrounding each respective shim hole 1444a, 1444b overhang each respective backing plate hole 1448. During assembly, the circumferential portions 1452a, 14526 may be bent into the respective backing plate holes 1448, to form a pair of bent annular tabs 1454a, 1454b (shown in FIGS. 14 and 17). The bent annular tabs 1454a, 1454b engage a circumferential edge of the backing plate holes 1448, and in the example illustrated, mechanically lock to the backing plate 1400 to help secure the shim 1434 to the backing plate 1400.

Referring still to FIGS. 18 and 19, the shim 1434 further includes a pair of side tabs 1456a, 1456b (also referred to as a first side tab 1456a and a second side tab 1456b), projecting outwardly from opposed sides of the shim 1434. During assembly, the shim 1434 can be positioned against the caliper facing surface 1432, and the side tabs 1456a, 1456b may be bent towards the rotor facing surface 1430 of the backing plate 1400, until each of the side tabs 1456a, 1456b abuts a respective one of the side edges 1458a, 1458b of the backing plate 1400 and forms bent side tabs 1460a, 1460b (shown in FIG. 14). In the example illustrated, the bent side tabs 1460a, 1460b mechanically lock to the backing plate 1400 to help secure the shim 1434 to the backing plate 1400.

In alternative examples, various other features, including various other holes and tabs, may be included on the shim 1434 and may be bent to engage the backing plate 1400 during assembly of the brake pad 1418.

Referring still to FIGS. 18 and 19, in the example shown, the shim 1434 further includes a pair of alignment holes 1462a, 14626, extending through the shim 1434. The alignment holes 1462a, 1462b are sized and positioned to receive a pair of lugs 1464a, 1464b (shown in FIGS. 14 to 16) of the backing plate 1400, to align the shim 1434 on the backing plate 1400. In alternative examples, the lugs 1464a, 1464b and/or the alignment holes 1462a, 1462b may be omitted, and the shim 1434 may be aligned with the backing plate 1400 by the tool used to assemble the backing plate 1400 and the shim 1434. For example, the lugs 1464a, 1464b may be omitted so that the caliper facing surface 1432 of the backing plate 1400 is generally planar with no protrusions extending outwardly therefrom.

Referring now to FIGS. 20 to 25, to assemble the brake pad 1418, the friction pad 1408, backing plate 1400, and shim 1434 may first be aligned in a fixture of a press (not shown). As shown in FIGS. 20 to 23, the first layer 1410 of the friction pad 1408 may be aligned with and positioned against the piercing members 1404 of the rotor facing surface 1430 of the backing plate 1400, and the shim 1434 may be aligned with and positioned against the caliper facing surface 1432 of the backing plate 1400. As mentioned above, the shim 1434 may be positioned with respect to the backing plate 1400 so that the shim holes 1444a, 1444b are aligned with the backing plate holes 1448 (not visible in FIGS. 20 and 21), and the respective portions 1452a, 1452b of the shim 1434 that surround the shim holes 1444a, 1444b may overhang the backing plate holes 1448. The positioning and aligning of the shim may optionally be facilitated by inserting the lugs 1464a, 1464b into the alignment holes 1462a, 1462b (labelled in FIGS. 14 to 19).

Optionally, prior to aligning and positioning the friction pad 1408, backing plate 1400, and shim 1434, an adhesive may be applied between the friction pad 1408 and the backing plate 1400 (as described above), and/or between the backing plate 1400 and the shim 1434. For example, adhesive may be applied to the plate facing surface 1436 of the shim 1434, and/or the caliper facing surface 1432 of the backing plate 1400. The adhesive may be, for example, a pressure sensitive adhesive. The use of an adhesive may enhance the noise damping properties of the shim.

Figure 24:
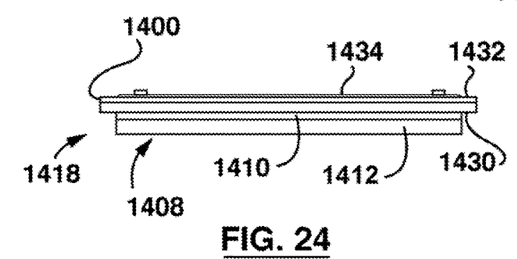
FIG. 24 is a schematic side view of the friction pad, backing plate, and shim of FIG. 14, after being secured together by a press.
Figure 25:
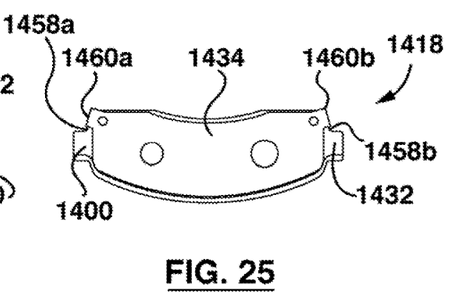
FIG. 25 is a top view of the friction pad, backing plate, and shim of FIG. 24.

Referring to FIGS. 24 and 25 the press may then be engaged to impale the piercing members 1404 of the backing plate 1400 into the friction pad 1408, and concurrently bend the features of the shim 1434 to engage the backing plate 1400. For example, the fixture of the press may include a lower portion and an upper portion (also referred to as a punch). The lower portion may define a cavity in which the friction pad 1408, backing plate 1400, and shim 1434 are received. The upper portion may include a deformable material (not shown), such as a soft rubber. When the press is engaged, the upper portion may be pressed towards the lower portion, to compress the friction pad 1408, backing plate 1400, and shim 1434. As the rubber is forced against the shim 1434, the rubber may elastically deform and enter the cavity, and thereby bend the features of the shim 1434 towards the rotor facing surface 1430 of the backing plate 1400. For example, the deforming rubber may bend the side tabs 1456a, 1456b of the shim 1434 until they abut and engage the side edges 1458a, 1458b of the backing plate 1400, to form bent side tabs 1460a, 1460b. Furthermore, the deforming rubber may bend the portions 1452a, 1452b of the shim 1434 surrounding the shim holes 1444a, 1444b into the backing plate holes 1448, so that these portions form bent annular tabs 1454a, 1454b that engage the backing plate 1400. As the force continues to be applied, the piercing members 1404 may pierce the friction pad 1408, as described above with respect to FIGS. 1 to 13.

When the friction pad 1408 is fully impaled on the piercing members (e.g. when the piercing members abut the hard second layer of the friction pad 1408), and the features of the shim 1434 are bent to sufficiently engage the backing plate 1400, as shown in FIGS. 24 and 25, the press may be released.

In some examples, in use, the bent side tabs 1460a, 1460b may provide mechanical wear sensors for the brake pad 1418. For example, as the friction pad 1408 ablates, contact of the rotor with the bent side tabs 1460a, 1460b may cause a noise that indicates that the brake pads may need service.

In alternative examples, the processes described herein may be used to assemble a shim to a backing plate, without concurrently assembling a preformed friction pad to the backing plate.

While the above description provides examples of one or more processes or apparatuses, it will be appreciated that other processes or apparatuses may be within the scope of the accompanying claims.

The invention claimed is:

1. A brake pad backing plate comprising:
   a steel workpiece having a rotor facing surface and a caliper facing surface, wherein the rotor facing surface comprises two texturized regions that are generally circular for receiving two disc-shaped friction pads, wherein each texturized region comprises a plurality of grooves and a plurality of piercing members formed from material carved from the grooves, wherein each piercing member has a respective pointed tip, and each pointed tip points away from the rotor facing surface, and wherein the pointed tips penetrate the two disc-shaped friction pads and wherein the two disc-shaped friction pads are generally flat and devoid of complimentary mating elements for the plurality of piercing members.

2. The brake pad backing plate of claim 1, wherein each pointed tip points away from the rotor facing surface at an angle of between about 60 degrees and about 110 degrees with respect to the rotor facing surface.

3. The brake pad backing plate of claim 2, wherein the angle is between about 80 degrees and 100 degrees with respect to the rotor facing surface.

4. The brake pad backing plate of claim 1, wherein each piercing member has a height from the rotor facing surface of between about 0.010 inches and 0.125 inches.

5. The brake pad backing plate of claim 1, wherein the height is about 0.090 inches.

6. The brake pad backing plate of claim 1, wherein the piercing members are arranged in rows.

7. The brake pad backing plate of claim 1, wherein the rotor facing surface is protectively coated.

8. A method of assembling a brake pad, comprising:
   a. providing two disc-shaped preformed friction pads;
   b. providing a brake pad backing plate comprising a steel workpiece having a rotor facing surface and a caliper facing surface, wherein the rotor facing surface comprises two texturized regions that are generally circular for receiving the disc-shaped friction pads, wherein each texturized region comprises a plurality of grooves and a plurality of piercing members formed from material carved from the grooves, wherein each piercing member has a respective pointed tip, and each pointed tip points away from the rotor facing surface; and
   c. impaling the preformed friction pads on the piercing members by piercing the performed friction pad with the pointed tips, and wherein the preformed friction pads are generally flat and devoid of complimentary mating elements for the plurality of piercing members.

9. The method of claim 8 wherein the brake pad backing plate is not heated during the impaling step.

* * * * *